United States Patent
Westerink et al.

(10) Patent No.: US 7,886,070 B2
(45) Date of Patent: Feb. 8, 2011

(54) SOURCE UPDATING FOR STREAMING BASED SERVERS

(75) Inventors: Peter Hans Westerink, Ossining, NY (US); Paolo Dettori, Elmsford, NY (US); Zhengua Fu, Yorktown Heights, NY (US); Julio Nogima, White Plains, NY (US); Frank A. Schaffa, Hartsdale, NY (US)

(73) Assignee: International Business Corporation, Armonk, NY (US)

( * ) Notice: Subject to any disclaimer, the term of this patent is extended or adjusted under 35 U.S.C. 154(b) by 261 days.

(21) Appl. No.: 12/014,353

(22) Filed: Jan. 15, 2008

(65) Prior Publication Data

US 2009/0182888 A1 Jul. 16, 2009

(51) Int. Cl.
  *G06F 15/16* (2006.01)
(52) U.S. Cl. .................................... 709/231
(58) Field of Classification Search ............... 709/231
  See application file for complete search history.

(56) References Cited

U.S. PATENT DOCUMENTS

| | | | |
|---|---|---|---|
| 6,493,876 B1 | 12/2002 | DeFreese | |
| 6,816,904 B1 * | 11/2004 | Ludwig et al. | 709/226 |
| 2003/0236907 A1 * | 12/2003 | Stewart et al. | 709/231 |
| 2004/0189873 A1 | 9/2004 | Konig | |
| 2005/0223107 A1 * | 10/2005 | Mine et al. | 709/231 |
| 2006/0126544 A1 * | 6/2006 | Markel et al. | 370/310 |
| 2007/0022178 A1 | 1/2007 | Lee | |
| 2007/0169090 A1 * | 7/2007 | Kang | 717/168 |
| 2008/0056682 A1 * | 3/2008 | Minnick et al. | 386/112 |
| 2008/0248786 A1 * | 10/2008 | Yamada et al. | 455/414.2 |
| 2009/0125951 A1 * | 5/2009 | Agricola et al. | 725/91 |

* cited by examiner

*Primary Examiner*—Wing F Chan
*Assistant Examiner*—Tesfay Yohannes
(74) *Attorney, Agent, or Firm*—Michael J. Buchenhorner; Derek S. Jennings

(57) ABSTRACT

A method includes the steps of: detecting a request from a client to restart a streamed multimedia presentation from a new starting point; determining if an update to a source file of the streamed multimedia presentation is available; if the update is available: closing the source file, opening the update, and establishing a link to the existing data channel; locating the new starting point of the streamed multimedia presentation; and streaming the multimedia presentation from the new starting point.

14 Claims, 4 Drawing Sheets

SOURCE UPDATING FOR STREAMING BASED SERVERS

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of multimedia presentations and more particularly relates to the field of updating streamed multimedia presentations.

BACKGROUND OF THE INVENTION

In the last few years the recording and playback of digital multi-media presentations has increased drastically. Several systems and technologies exist that define and implement the storage and playback of these digital multimedia presentations. The large majority of these presentations include audio and video, but systems also exist that extend these presentation formats with other synchronized media such as images and text (closed captioning).

The playback of these presentations can be performed on the system where the presentation data itself is stored. In actuality, the data is typically stored in a remote repository, allowing the same data to be accessed by many different viewers. There are two methods by which the viewers (also known as "players" or "clients") can access the data: by download or by streaming.

When downloading the data the client copies all of the data from the repository to the system on which the client resides and once all data is received the client plays the received data as a local presentation. In a streaming scenario, however, the data is sent to the client and while the client receives the data it is presented in a viewer. Typically no local copy is made of the data in that case. Streaming a remote file to a local client for viewing is also called "Video-On-Demand" (VOD) and the system that transmits the data is often called the "server."

Many existing presentation viewers support a looping mode, where the same source is played over-and-over again. The looping mode applies both to local playback and to streamed playback. One example of a situation where viewers may be used in looping mode is an in-store display where a commercial video is shown repeatedly. In this situation the achieved objective is to automatically play the same presentation repeatedly without requiring any user intervention or supervision on either the server or the client system.

One problem that must be overcome in these multimedia looping systems is that switching to a new or other version cannot be accomplished by simply replacing the file with the current version with a new file. Multimedia looped streaming typically works with an opened file and restarting a loop is performed not by asking for the same file but requesting the server to "rewind" or seek to the beginning and restart streaming from thereon, without closing the multimedia source file and re-opening it again. The reason that most viewers realize looping this way is for performance. Closing and re-opening a file and re-establishing the data channels takes time and resources, which the client experiences as a longer delay.

Referring now in specific detail to the drawings, and particularly FIG. 1, there is shown a flow chart of the typical procedure of a viewer that is put into a looping mode for a streamed presentation. In step 110 the viewer contacts the server to request streaming of a certain stored presentation. Next, in step 120 the server begins streaming the data to the viewer. The viewer presents the data as the data is received (possibly with some buffering to manage network and bandwidth issues) in step 130. Then, in step 140, when the presentation comes to an end the viewer stays connected to the server and instructs the server to rewind the presentation to the beginning and resume streaming from the presentation starting position.

SUMMARY OF THE INVENTION

Briefly, according to an embodiment of the invention a method includes steps or acts of: detecting a request from a client to restart a streamed multimedia presentation from a new starting point; determining if an update to a source file of the streamed multimedia presentation is available; if the update is available: closing the source file, opening the update, and connecting the update to data channels between the source file and the client; locating the new starting point of the streamed multimedia presentation; and streaming the multimedia presentation from the new starting point. The method can be advantageously used with streaming video-on-demand presentations.

According to another embodiment of the present invention, a system for updating a streamed multimedia presentation includes: a server that includes logic for performing the method steps above; a client viewer; and a storage system including at least one source file.

A computer program product embodied on a computer readable medium includes code, that, when executed, causes a computer to perform the method steps as described above.

The method can also be implemented as machine executable instructions executed by a programmable information processing system or as hard coded logic in a specialized computing apparatus such as an application-specific integrated circuit (ASIC).

BRIEF DESCRIPTION OF THE DRAWINGS

To describe the foregoing and other exemplary purposes, aspects, and advantages, we use the following detailed description of an exemplary embodiment of the invention with reference to the drawings, in which.

Figure 1:
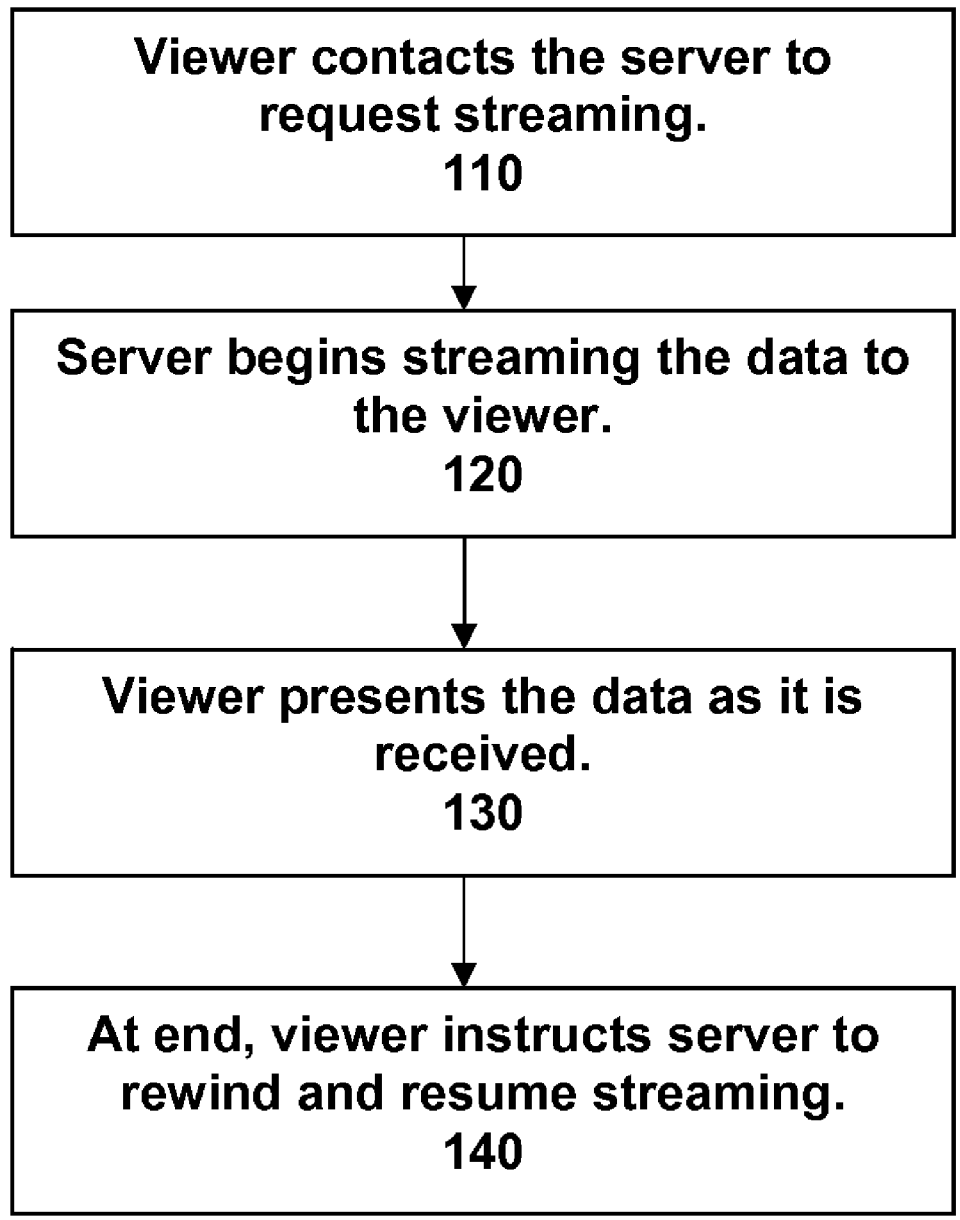
FIG. 1 is a flow chart of a procedure for looping a streamed presentation, according to the known art.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We describe a looped multimedia presentation source updating system that overcomes the shortcomings of the known art as outlined above. It can be advantageously applied to streamed Video-on-Demand (VOD) presentations, where the invention is implemented on the server side without requiring changes or adaptations to the viewer and to the currently running protocols. Therefore existing viewers can be used without having to be modified.

In looping streamed applications it may be desirable to update the repeated presentation with a different version or even with an entirely new one. It is desirable that this is done without user intervention on the viewer and without interruptions to the ongoing looping. One method by which this can be accomplished is by replacing the source of the multimedia presentation at the moment that the player comes to the end of a loop and prepares to restart the presentation again from the beginning.

According to a preferred embodiment of the present invention, a server implementing the source updating system detects a signal from the client requesting the same source to be played again from the beginning (or some other starting point). Once the signal is received the server will determine if a newer version than the current multimedia file is available. Rather than responding to a signal received from a client viewer, the server can be programmatically set to search for a new version at the end of the current loop. If a newer version is available the server closes the current one and opens the new version instead. After opening the new version, the server "connects" this new version to the original data channels that are still intact.

The server then proceeds to locate the requested position in the open multimedia file (which may or may not be an updated version depending on whether there was a new version available) and resumes streaming from the requested position. Note that a default starting position (the beginning of the file, for example) can be set so that the starting position does not have to be specified. By implementing this procedure on the server this invention allows the use of existing multimedia clients (or "players") as is without any intervention during the looping process.

Figure 2:
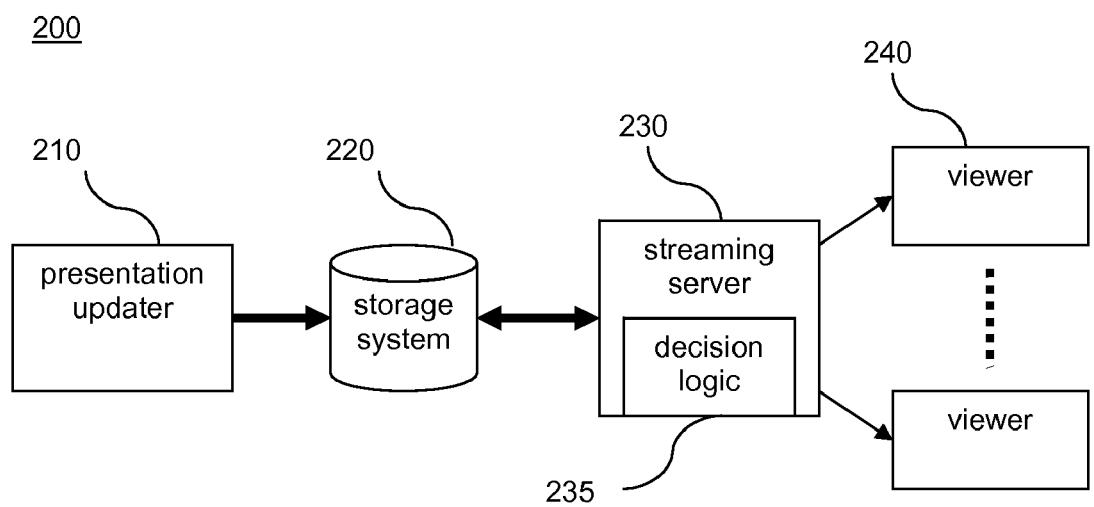
FIG. 2 is a pictorial representation of a streaming multi-media system, according to an embodiment of the present invention.

It is important to note that there is a difference between how the viewer first requests the data and how the viewer requests the same data to be looped from the beginning or some other new starting point in subsequent requests:

1. The server detects a request to stream the same presentation from some new starting point, typically but not necessarily the beginning,
2. The server checks with the storage system if an update is available for the same presentation, and if an update is available, closes the current presentation, opens the updated one instead of the old one, and links the updated presentation to the current data channels,
3. The server Seeks to the requested position (typically the beginning),
4. The server Starts streaming the presentation from the requested position Referring now to FIG. 2, there is illustrated a pictorial representation of a system 200 with a viewer 240, streaming server 230, storage system 220, and a presentation updater 210. Note that for purposes of this disclosure the terms "viewer," "client," and "player" are synonymous and interchangeable.

According to an embodiment of the invention, the presentation updates are known to the server storage system by adding version numbers to the presentation file. An update is detected as being available if a version number higher than the currently-running version is available. Note that other mechanisms for defining what constitutes an "update" or "newer version" may be devised by those skilled in the art.

In an alternate embodiment, the method provides a capability for different viewers 240 to use the same URL for requests to receive a presentation. Each viewer 240 is able to control its own content, based on some properties like location. Although the multiple viewers 240 in this case are viewing a presentation originating from the same source file, each viewer 240 can independently control its content such that different viewers 240 may be receiving different versions and/or portions of the presentation simultaneously. In this case, the decision logic 235 in the streaming server 230 selects which "version" to send to the viewers when versions get updated.

Figure 3:
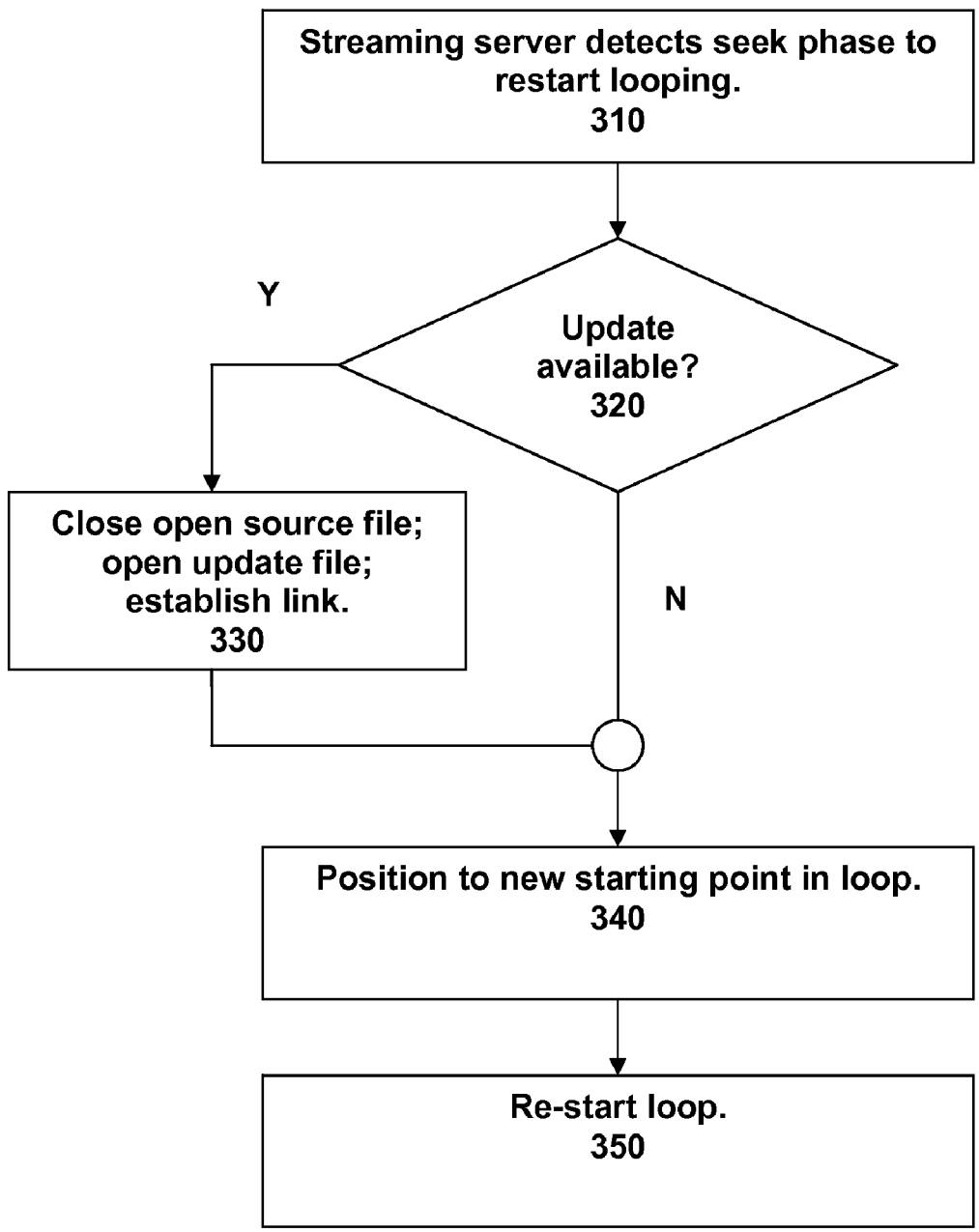
FIG. 3 is a high level flow chart of a method for a streaming multi-media system, according to an embodiment of the present invention.

Referring to FIG. 3, there is shown a flow chart of a method for updating a streamed multimedia presentation, according to the present invention. First, in step 310 the streaming server 230 detects the rewind phase from a client viewer. In proceeding to restart the streamed loop, the streaming server 330 must determine if a source replacement should be made in step 320. This is done by querying the storage system 220. If the source should be replaced (as indicated by the presence of an updated version), then in step 330 the server 230 closes the open source file and opens the update file. The replacement is not detected by the client because the data channels between server and client remain intact. Next, the server 230 locates the new starting point, which may or may not be the beginning of the loop, in step 340. Lastly, in step 350 streaming from the file is re-started.

Figure 4:
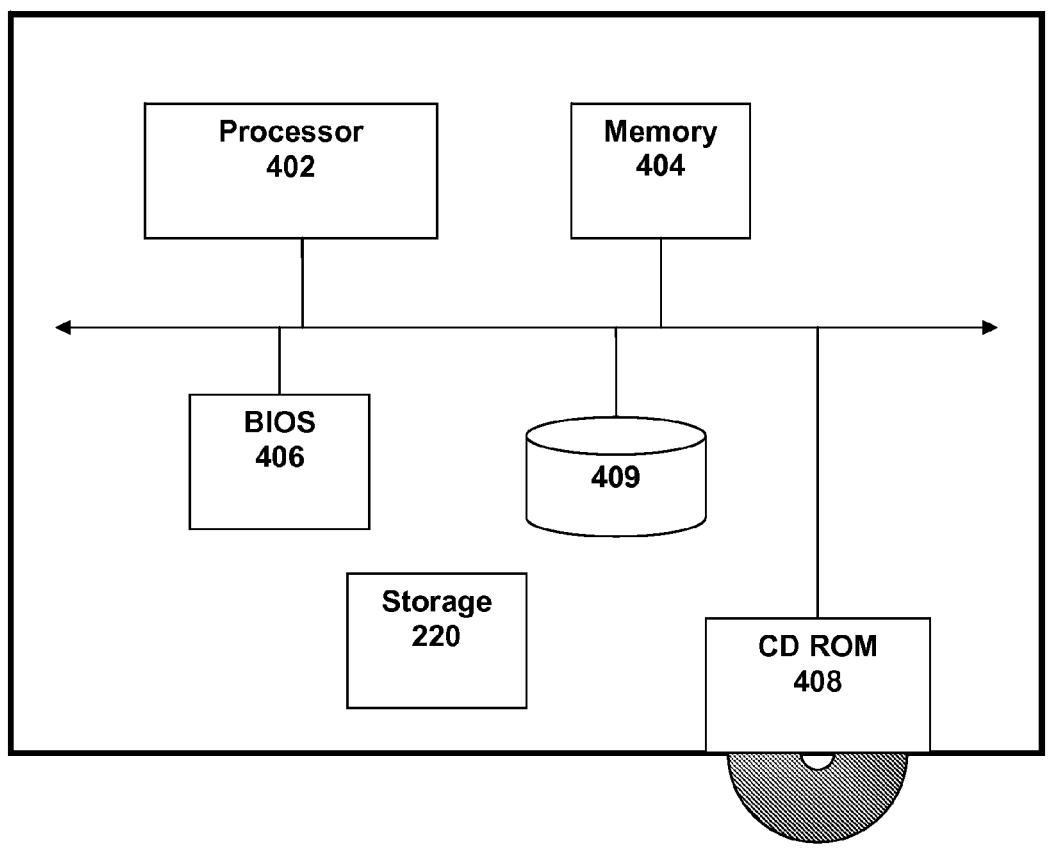
FIG. 4 is a simplified block diagram of a server for performing the method according to an embodiment of the present invention.

Referring to FIG. 4, there is shown a simplified block diagram of a server configured to operate according to an embodiment of the present invention. For purposes of this invention, server 230 represents any type of computer, information processing system or other programmable electronic device, including a server computer, a portable computer, an embedded controller, a personal digital assistant, and so on. The server 230 may be a stand-alone device or networked into a larger system.

The server 230 could include a number of operators and peripheral devices as shown, including a processor 402, a memory 404, and an input/output (I/O) subsystem 406. Optionally, the storage system 220 may be located within the server 230.

The processor 402 may be a general or special purpose microprocessor operating under control of computer program instructions executed from a memory. The processor may include a number of special purpose sub-processors, each sub-processor for executing particular portions of the computer program instructions. Each sub-processor may be a separate circuit able to operate substantially in parallel with the other sub-processors. Some or all of the sub-processors may be implemented as computer program processes (software) tangibly stored in a memory that perform their respective functions when executed. These may share an instruction processor, such as a general purpose integrated circuit microprocessor, or each sub-processor may have its own processor for executing instructions. Alternatively, some or all of the sub-processors may be implemented in an ASIC. RAM may be embodied in one or more memory chips. The memory 404 may be partitioned or otherwise mapped to reflect the boundaries of the various memory subcomponents.

The memory 404 represents either a random-access memory or mass storage. It can be volatile or non-volatile. The server 230 can also comprise a magnetic media mass storage device such as a hard disk drive 409.

The I/O subsystem 406 may comprise various end user interfaces such as a display, a keyboard, and a mouse. The I/O subsystem 406 may further include a connection to a network such as a local-area network (LAN) or wide-area network (WAN) such as the Internet. Processor and memory components are physically interconnected using conventional bus architecture.

According to an embodiment of the invention, a computer readable medium, such as a CDROM 408 can include program instructions for operating the server 230 according to the invention.

What has been shown and discussed is a highly-simplified depiction of a programmable computer apparatus. Those skilled in the art will appreciate that a variety of alternatives are possible for the individual elements, and their arrangement, described above, while still falling within the scope of the invention. Thus, while it is important to note that the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of signal bearing media include ROMs, DVD-ROMs, and transmission-type media, such as digital and analog communication links, wired or wireless communications links using transmission forms, such as, for example, radio frequency and light wave transmissions. The signal bearing media make take the form of coded formats that are decoded for use in a particular data processing system.

Therefore, while there has been described what is presently considered to be the preferred embodiment, it will understood by those skilled in the art that other modifications can be made within the spirit of the invention. The above description of a preferred embodiment is not intended to be exhaustive or limiting in scope. The embodiment, as described, was chosen in order to explain the principles of the invention, show its practical application, and enable those with ordinary skill in the art to understand how to make and use the invention. It should be understood that the invention is not limited to the embodiment described above, but rather should be interpreted within the full meaning and scope of the appended claims.

We claim:

1. A method comprising steps of:
   using a server computer for:
   detecting a request from a client to restart a streamed multimedia presentation from a new starting point;
   determining if an update to a source file of the streamed multimedia presentation is available, wherein determining if the update is available comprises:
   accessing a storage system; and
   locating the update in the storage system;
   when it is determined that the update is available:
   closing the presentation by closing the source file,
   opening an update file comprising the update, and
   establishing a link to the update file using an existing data channel between the source file and the client;
   locating the new starting point of the streamed multimedia presentation in the update file; and
   resuming streaming the multimedia presentation to the client from the new starting point.

2. The method of claim 1 wherein the streamed multimedia presentation is in looping mode.

3. The method of claim 1 wherein detecting the request comprises detecting that the presentation is in a seek phase.

4. The method of claim 1 wherein locating the update comprises locating a file of the presentation comprising a version number higher than the version number of the source file.

5. The method of claim 1 wherein detecting the request comprises perceiving a signal from the client.

6. The method of claim 1 wherein detecting the request comprises programmatically responding to reaching an end of a loop.

7. The method of claim 1 wherein the new starting point is set by default.

8. The method of claim 3 wherein the seek phase comprises a rewind phase.

9. The method of claim 4 further comprising:
   for multiple clients receiving different versions of the update, selecting which version of the update to transmit to each client.

10. A system for updating a streamed multimedia presentation, the system comprising:
    a client;
    a storage system comprising a source file; and
    a server comprising decision logic for:
    detecting a request from a client to restart the streamed multimedia presentation from a new starting point;
    determining if an update to the source file of the streamed multimedia presentation is available, wherein determining if the update is available comprises:
    accessing the storage system; and
    locating the update in the storage system;
    when it is determined that the update is available:
    closing the presentation by closing the source file,
    opening an update file comprising the update, and
    establishing a link to the update file using an existing data channel between the source file and the client;
    locating the new starting point of the streamed multimedia presentation in the update file; and
    resuming streaming the multimedia presentation from the new starting point.

11. The system of claim 10 wherein the source file comprises a version number used to determine if an update is available.

12. The system of claim 10 wherein the storage system is a component of the server.

13. The system of claim 10 wherein the presentation is a streamed video-on-demand presentation.

14. A computer program product embodied on a non-transitory computer readable storage medium and comprising code that, when executed, causes a computer to:
    detect a request from a client to restart streaming a multimedia presentation from a new starting point;
    determine if an update to a source file of the streamed multimedia presentation is available, wherein determining if the update is available comprises:
    accessing a storage system; and
    locating the update in the storage system;
    when it is determined that the update is available:
    close the presentation by closing the source file,
    open an update file comprising the update, and establish a link to the update file using an existing data channel between the source file and the client;
locate the new starting point of the streamed multimedia presentation in the update file; and resume streaming the multimedia presentation from the new starting point.

* * * * *